United States Patent [19]
Yamamoto et al.

[11] 3,733,898
[45] May 22, 1973

[54] FLOW CONDITIONING APPARATUS

[75] Inventors: Hiroshi Yamamoto, Kanagawa; Kuniteru Okuda, Machida; Hiroaki Nomoto, Koganei, all of Japan

[73] Assignee: Oval Engineering Co., Ltd., Tokyo, Japan

[22] Filed: Apr. 19, 1971

[21] Appl. No.: 135,018

[30] Foreign Application Priority Data

June 5, 1970 Japan ............................ 45/48188
Sept. 26, 1970 Japan ............................ 45/83896
Nov. 24, 1970 Japan ............................ 45/105245

[52] U.S. Cl. .................... 73/198, 73/205, 73/211, 138/39
[51] Int. Cl. .................................................. G01p 5/14
[58] Field of Search ................ 73/198, 205 R, 205 L, 73/211; 138/37, 39, 44

[56] References Cited

UNITED STATES PATENTS 1,540,533  6/1925  Bullock ............................... 73/198
2,929,248  3/1960  Sprenkle ............................. 73/198
3,398,765  8/1968  Ryoichiro Oshima et al. ....... 138/39

FOREIGN PATENTS OR APPLICATIONS 34,657  10/1908  Austria ............................... 73/198

*Primary Examiner*—James J. Gill
*Attorney*—William D. Hall, Elliott I. Pollock, Fred C. Philpitt, George Vande Sande, Charles F. Steininger and Robert R. Priddy

[57] ABSTRACT

A flow conditioning apparatus is connected to the inlet of a flow meter in a conduit system for conditioning the flow of a fluid supplied to the flow meter for the purpose of measurement of the flow rate. The apparatus comprises a device for uniformalizing the velocity distribution of fluid flow, and this device is combined with a vortex regulator and a flow straighter for more effectively conditioning the fluid flow.

8 Claims, 16 Drawing Figures

H. YAMAMOTO
K. OKUDA
H. NOMOTA
INVENTOR

BY

ATTORNEY

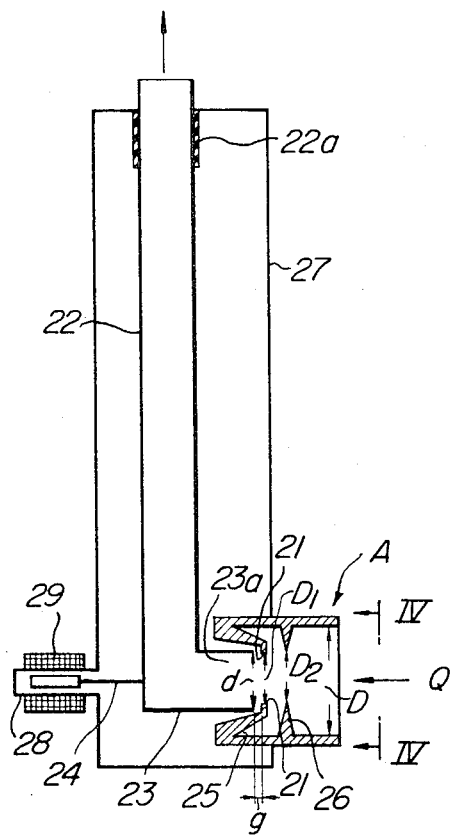
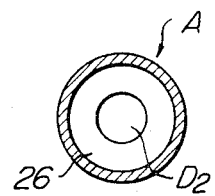
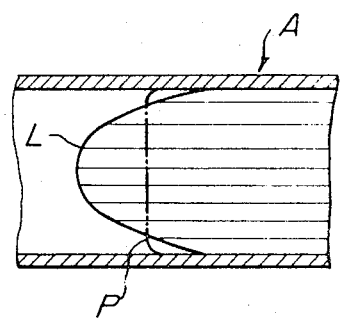

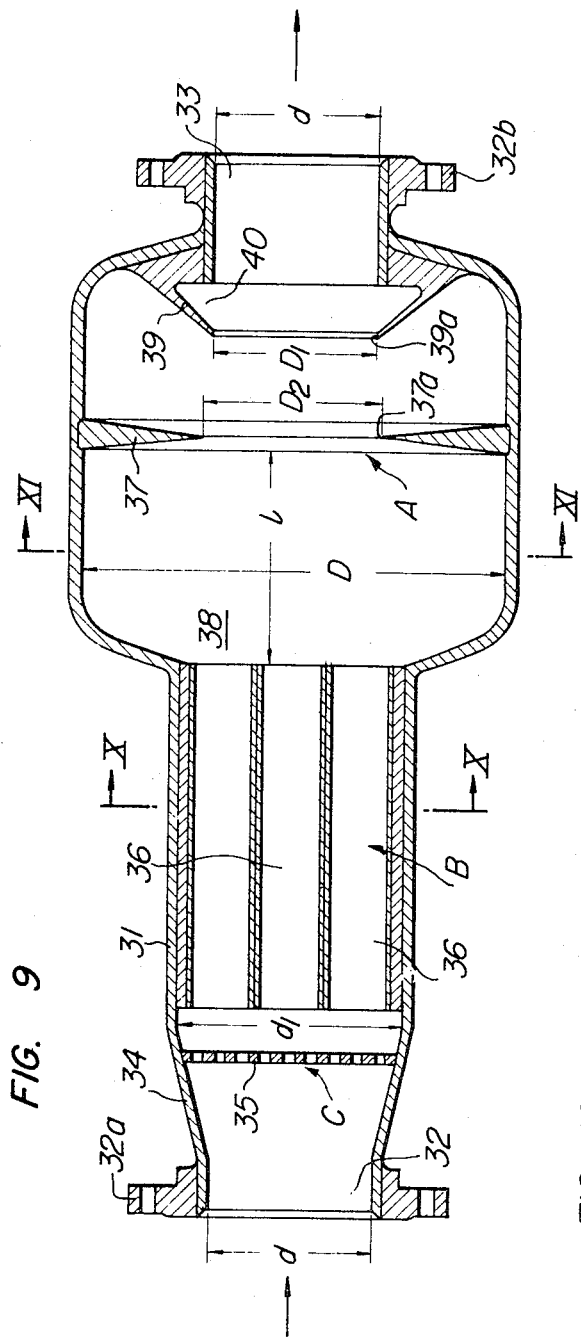
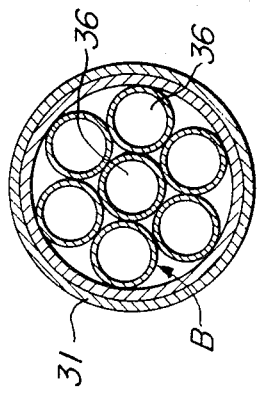
FIG. 9
FIG. 10

FLOW CONDITIONING APPARATUS

BACKGROUND AND SUMMARY OF THE INVENTION

This invention relates to a flow conditioning apparatus for conditioning the flow of a fluid to obtain a so-called plug flow.

Two major problems are generally encountered in the measurement of flow rate by means of a so-called analog flow meter, such as an orifice plate type flow meter or Venturi tube type flow meter, or by means of a semi-positive flow meter such as a turbine meter or vortex flow meter.

The first major problem includes three problems concerned with the conditions of fluid flow. More precisely, the first problem arises from the fact that a fluid flowing through a bent pipe such as an elbow has an asymmetrical velocity distribution due to the difference between the velocity of fluid flow along the inner wall portion having a smaller radius, that is, the inner wall portion where the elbow has a smaller radius of curvature, and the velocity of fluid flow along the inner wall portion having a larger radius, that is, the inner wall portion where the elbow has a larger radius of curvature. The second problem arises from the fact that the measuring instrument or meter is adversely affected by a large number of vortices produced in fluid flow by a valve such as a gate valve. The third problem relates to a secondary flow or twisting flow which is said to be caused during the flow of a fluid through a pipe. With particular reference to the third problem of the secondary or twisting flow, it is commonly known that a fluid does not necessarily flow through a straight pipe in a uniformly streamlined condition but generally flows through such a pipe while rotating in a greatly twisted form. In brief, there is firstly a problem of asymmetrical fluid flow velocity distribution due to the difference between the radii of curvature at one side and the other side of a bent pipe, secondly a problem of buildup of vortices of varying sizes due to the passing of fluid through a flow restricting means such as a valve, and thirdly a problem of twisting flow occurring in a pipe. These problems are the principal factors which necessitate the conditioning of flow in the case in which the flow rate is measured by an analog flow meter or semi-analog flow meter.

The second major problem arises from the fact that anyone of the three kinds of flow above described is in no way constant under all the operating conditions of a flow meter used for the measurement of the flow rate. It is therefore necessary to condition the flow of a fluid to obtain a parallel flow having a uniform velocity distribution, that is, to obtain a plug flow.

It is a primary object of the present invention to provide a novel flow conditioning apparatus which solves simultaneously the two major problems above described, that is, an apparatus which provides an effective solution to the first problem by conditioning the flow of a fluid subject to flow rate measurement, and at the same time, satisfies the required uniformity in the velocity distribution of fluid flow in a pipe under all the conditions of measurement thereby solving the second problem.

Heretofore, the above problems have been considered to have a certain relationship with the Reynolds number of fluid or the length of a straight pipe portion. Thus, according to prior art practice to deal with the above problems, it has been said that measurement can be satisfactorily carried out when the Reynolds number of a fluid subject to flow rate measurement is higher than, for example, $10^4$ or when the straight pipe portion has a length which is more than thirty times the diameter thereof. The precision of measurement with the apparatus of the present invention is so high that, even when measurement is taken under the conditions in which the Reynolds number and the pipe length are less than the said critical values, it is substantially equivalent to the precision of measurement that can be obtained with prior art apparatus under the conditions in which the Reynolds number and the pipe length are more than the said critical values.

In a prior art flow rate measuring system, a known flow conditioning means such as a flow straighter is disposed upstream of a flow meter such as a turbine meter. This measuring system has been fairly satisfactory in that the non-uniform secondary flow which is produced due to the presence of a bent pipe and a valve on the upstream side of the turbine meter as described in the first problem can be considerably eliminated to provide a flow which is fairly analogous to a plug flow, but it has been impossible with this prior art measuring system to obtain an ideal plug flow suitable for successful measurement of the flow rate. Therefore, the conditions presently set forth for the measurement of the flow rate by a flow meter such as an orifice plate type flow meter or turbine meter merely instruct that a pipe connected to the flow meter should have a straight portion of a length about thirty times the diameter thereof or a flow straighter should be provided in the conduit system in accordance with, for example, the API Standards (Standards of American Petroleum Institute) or ISA Standards (Standards of Instrument Society of America). In a practical example of a conduit system in which an elbow, a valve and a flow straighter are disposed in the above order on the upstream side of a turbine meter, and a valve and an elbow are disposed in this order on the downstream side of the turbine meter, a change in the opening of the valve disposed upstream of the flow straighter between the full open position and the half open position resulted in instrumental errors of the order of 0.4 to 0.5 percent in the measured value even when the flow straighter was connected in accordance with, for example, the ISA Standards, and more instrumental errors were liable to occur depending on the manner of manipulation of this valve.

It is apparent from the above fact that the prior art arrangement which meets merely the measuring conditions set forth in the API Standards and ISA Standards cannot attain the desired precision of measurement. Generally, the velocity of the portion of a fluid flowing through a conduit along the inner wall is lower than that of the central portion since the former portion makes frictional contact with the inner wall. Thus, the velocity of fluid flow in the pipe is distributed in the form of a curve of second degree, and a plug flow the velocity of which is uniformly distributed in the plane perpendicular with respect to the axis of the pipe cannot be obtained. Therefore, in order to overcome the above defects involved in the prior art flow rate measuring system, it is necessary to obtain a so-called parallel flow or plug flow in which the fluid flowing into the flow meter has a substantially uniform velocity distribution in the plane extending across the pipe. The present invention is intended to provide an effective solution to such technical problems.

It is therefore an object of the present invention to provide a flow condition apparatus which includes a fluid flow velocity distribution uninformalizing means capable of supplying a fluid to various types of flow meters such as a Venturi tube type flow meter, orifice plate type flow meter and turbine type flow meter as well as any other fluid flow responsive means in such a manner that the flow of the fluid is converted into a plug flow having a uniform velocity distribution within the pipe.

Another object of the present invention is to provide a flow conditioning apparatus which includes a vortex regulator and/or a flow straighter which may be suitably combined with the fluid flow velocity distribution uniformalizing means as required depending on the condition of flow within the pipe.

The above and other objects, features and advantages of the present invention will be apparent from the following detailed description of preferred embodiments thereof taken in conjunction with the accompanying drawings, in which:

BRIEF DESCRIPTION OF THE DRAWINGS

FIG. 3 is a schematic sectional view of a flow rate measuring system in which a fluid flow velocity distribution uniformalizing means according to the present invention is combined with a movable pipe type or flexible pipe type flow meter;

FIG. 4 is a side elevational view of the means of the present invention as viewed along the line IV — IV in FIG. 3;

FIG. 5 is an explanatory view showing how the fluid flow velocity distribution is uniformalized by the means of the present invention shown in FIG. 3;

FIGS. 7A, 7B, 7C, 7V and 7E are explanatory views showing the state of fluid flow at various portions of the system shown in FIG. 7;

FIG. 9 is a longitudinal sectional view showing the practical structure of the flow conditioning apparatus shown in FIG. 6; and FIGS. 10 and 11 are sectional views taken on the lines X — X and XI — XI in FIG. 9 respectively.

DESCRIPTION OF THE PREFERRED EMBODIMENTS

Figure 1:
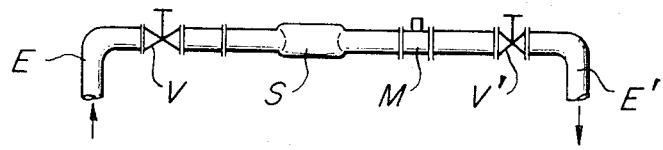
FIG. 1 is a schematic front elevational view showing parts of a prior art flow rate measuring system.

Referring to FIG. 3, a fluid flow velocity distribution uniformalizing means according to the present invention is generally designated by the reference character A. The fluid flow velocity distribution uniformalizing means A is of generally cylindrical shape, and has an inlet port of diameter D and an outlet port or discharge opening 21 of diameter $D_1$. The means A is fixed relative to a bent portion 23 of a flexible pipe 22 in such a relationship that the discharge opening 21 is spaced by a distance g from the end opening 23a of the bent pipe portion 23. The diameter $D_1$ of the discharge opening 21 of the means A is equal to or slightly larger than the diameter d of the end opening 23a of the bent pipe portion 23. The discharge opening 21 is defined by the inner peripheral end edge of an annular portion extending radially inwardly from a sloped portion which is an integral part of the cylindrical body of the means A and makes an acute angle with the body of the means A. This annular portion must have a wall thickness of such an extent that it will not be worn away by a fluid being transferred through the means A since the end edge of the annular portion defining the discharge opening 21 acts to regulate the flow rate of the fluid being discharged. It is preferable that the end edge of the annular portion defining the discharge opening 21 be as sharp as possible in order to effectively apply breakaway to the fluid flowing past this discharge opening 21. A sharp-edged annular lip 26 extends radially inwardly from the body of the means A at a position suitably spaced from the discharge opening 21 on the upstream side of the discharge opening 21, and an annular recess 25 of acuate angled sectional shape is defined between the discharge opening 21 and the annular lip 26 as shown. The annular lip 26 defines an orifice of diameter $D_2$ which is equal to or slightly larger than the diameter d of the opening 23a of the bent pipe portion 23 so as to easily cause turbulence in the fluid flowing through the means A while contacting the inner wall of the means A of the cylindrical shape. While only one annular lip 26 is shown in FIG. 3, two or more such annular lips may be provided.

In the flow rate measuring system illustrated in FIG. 3, the means A is securely fixed to the outer wall of a closed vessel 27, and the pipe 22 is fixed at its flexible discharge end portion 22a to the end wall of the vessel 27 so that the pipe 22 can freely make flexuous movement. The flexible pipe 22 may be replaced by a movable pipe which is rotatably mounted at its discharge end portion to the end wall of the vessel 27. A rod 24 extends from the bent pipe portion 23, and a core 28 mounted on the free end of the rod 24 is movably disposed in the space of the coil of a differential transformer 29 so that the displacement of the flexible pipe 22, which is proportional to the flow rate of the fluid, effects a corresponding movement of the rod 24 which is converted into a change in the current output of the differential transformer 29.

It will be seen that the portion of the fluid flowing through the means A near the inner wall thereof is first subject to turbulence by the sharp-edged annular lip 26, and then the fluid portion flowing along the inner wall of the means A on the downstream side of the annular lip 26 is subject to turbulence by the annular recess 25 provided adjacent to the discharge opening 21. Thus, this structure is not only effective for a fluid having a high Reynolds number but also effective for a fluid having an especially low Reynolds number, and the fluid flowing through the means A is converted from a flow in the form of a curve of second degree, as shown by the solid line in FIG. 5 to a plug flow (parallel flow) as shown by the chain line to be finally discharged from the discharge opening 21 as a stream having a uniform velocity distribution over its entire cross section.

Fluid flow through the conduit upstream of the flow conditioning apparatus may take the form of a flow having a non-uniform velocity distribution or vortex flow or twisting flow as described previously, but in the flow rate measuring system of the type shown in FIG. 3, the precision of measurement is not substantially affected by the flow of various kinds above described. However, in the case of a flow rate measuring system including a flow meter such as a turbine meter, a fluid flow velocity distribution uniformalizing means as described with reference to FIG. 3 may preferably be combined with a vortex regulator and a flow straighter, and this combination may be disposed on the upstream side of the turbine meter.

A flow rate measuring system including a flow conditioning apparatus of the present invention consisting of three means as above described will now be described while comparing it with a prior art flow rate measuring system.

Figure 2:
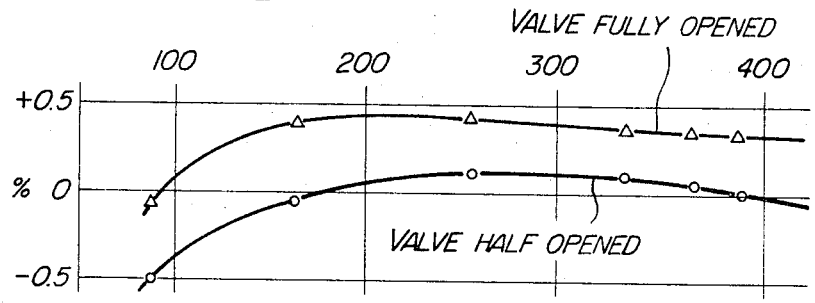
FIG. 2 is a graph showing instrumental errors observed with the flow rate measuring system shown in FIG. 1.

In one example of prior art flow rate measuring systems as shown in FIG. 1, a conduit system is constituted by a turbine meter M, a flow straighter S disposed upstream of the turbine meter M, a bent pipe or elbow E and a valve V disposed upstream of the flow straighter S, and a valve V' and a bent pipe or elbow E' disposed downstream of the turbine meter M. In this system, a change in the opening of the valve V on the upstream side of the flow straighter S between the full opening and half opening positions results in instrumental errors of the order of 0.4 to 0.5 percent as seen in FIG. 2 even when the flow straighter S is incorporated in the system in accordance with the ISA Standards. It will thus be apparent that instrumental errors of the degree shown in FIG. 2 are unavoidable at least with mere incorporation of the flow straighter in accordance with the standards presently generally employed in the art.

Figure 6:
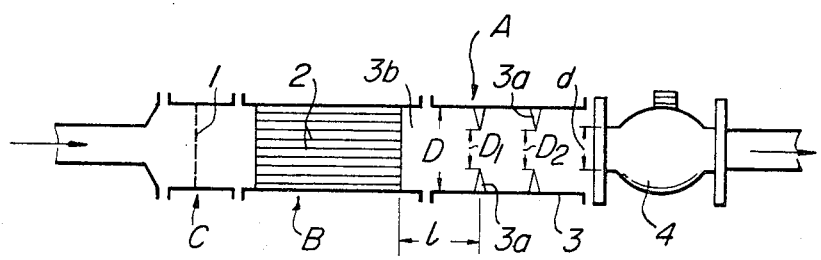
FIG. 6 is a schematic sectional view showing the basic structure of a flow conditioning apparatus of the present invention comprising a fluid flow velocity distribution uniformalizing means combined with a vortex regulator and a flow straighter.
Figure 7:
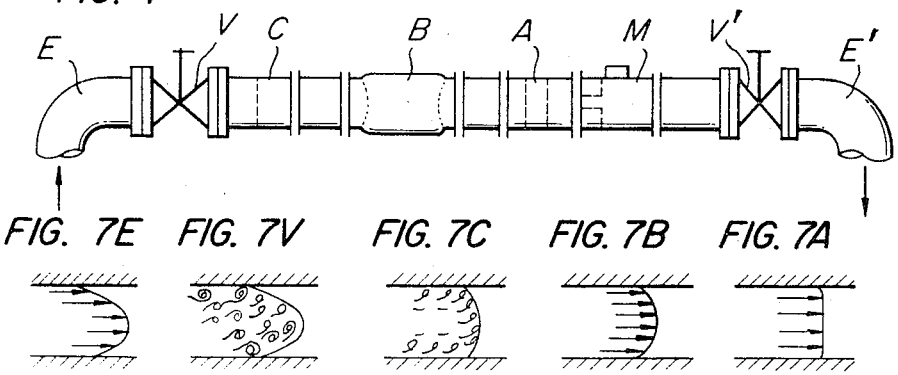
FIG. 7 is a schematic front elevational view showing a practical arrangement of a flow rate measuring system incorporating therein the flow conditioning apparatus shown in FIG. 6.

Such instrumental errors can be reduced to a minimum by a flow rate measuring system which includes therein a flow conditioning apparatus of the present invention as shown in FIGS. 6 and 7.

Referring to FIG. 6, a first means designated by the reference character C is a vortex regulator which comprises a perforate member 1 of network structure disposed in a cylindrical body. The perforate member 1 functions to change vortices of various sizes produced by conduit means such as a bent pipe and a valve into uniform vortices of a size equal to the mesh thereof, and is made of metal or any other suitable material. A second means designated by the reference character B is a so-called flow straighter which comprises a bundle of a multiplicity of parallelly disposed tubes 2 of small diameter contained in a cylindrical body. By the provision of the two means C and B, conditioning of the flow pertinent to the first problem described previously can be attained. In lieu of the small-diameter tubes, the flow straighter may comprise a plurality of sets of vanes disposed parallelly in the axial direction of the cylindrical body with each set consisting of a plurality of vanes extending radially in the plane perpendicular to the axis of the cylindrical body. A third means designated by the reference character A is a fluid flow velocity distribution uniformalizing means similar to that shown in FIG. 3. The fluid flow velocity distribution uniformalizing means A comprises a cylindrical body 3 having an inner diameter D and a plurality of spaced, sharp-edged annular lips 3a extending radially inwardly from the inner wall of the cylindrical body 3. The annular lips 3a define orifices having respective diameters $D_1$ and $D_2$ which are considerably smaller than the inner diameter D of the cylindrical body 3 and are equal to or slightly larger than the diameter d of the inlet port of a flow rate responsive means or flow meter 4. The distance between the outlet of the flow straighter B and the first annular lip 3a in the means A is selected to be considerably larger than the diameter $D_1$ of the orifice defined by the annular lip 3a so as to provide a deep pocket 3b in the means A. By this arrangement, a plug flow, that is, a fluid flow having a uniform velocity distribution can be supplied to the flow meter 4.

A practical conduit system embodying the arrangement shown in FIG. 6 will be described with reference to FIG. 7. Referring to FIG. 7, the conduit system comprises a bent pipe or elbow E, a valve V, a vortex regulator C, a flow straighter B, a fluid flow velocity distribution uniformalizing means or flow converting means A, a turbine meter M, a valve V' and a bent pipe or elbow E' arranged in the above order.

It is assumed herein that a fluid flows in a direction as shown by the arrows. The fluid flow appearing at the outlet of the elbow E has an asymmetrical velocity distribution as shown in FIG. 7E. When this fluid flow is passed through the valve V, many vortices are produced in the fluid flow having the asymmetrical velocity distribution as shown in FIG. 7V. When the fluid flow including many vortices therein is passed through the vortex regulator C, including the perforate member of network structure therein, the vortices of varying sizes are converted by the meshes into vortices of substantially uniform size corresponding to the size of the mesh and a regulated fluid flow as shown in FIG. 7C appears at the outlet of the vortex regulator C. The vortices disappear after the fluid flow is passed through the flow straighter B. As seen in FIG. 7B, the fluid flow leaving the flow straighter B has parallel streamlines and its velocity distribution is uniformalized to a considerable degree, but this fluid flow is far from an ideal plug flow due to the interaction of the fluid with the cylindrical wall, etc. This fluid flow is then supplied to the flow converting means A to be converted into a plug flow as shown in FIG. 7A, and this plug flow is supplied to the turbine meter M. It will thus be seen that the fluid is necessarily supplied to the turbine meter M in the form of a satisfactorily conditioned plug flow which has a uniform velocity distribution under any conditions with which the fluid is supplied to the conduit system.

If a vortex flow, asymmetrical flow or twisting flow were supplied to the turbine meter (or any other analog flow meter), the turbine rotor would be accelerated or decelerated due to the non-uniformity of the fluid flow and its rotation would not be really indicative of the flow rate. The present invention eliminates such an adverse effect so that the turbine meter can make very stable rotation for accurately measuring the flow rate and errors can be reduced to a minimum.

The present invention having such an arrangement is advantageous in that it is quite suitable for use in combination with an analog flow meter such as a turbine meter as well as any other flow meters commonly used in this field for the conditioning of a fluid supplied to these flow meters. Another advantage resides in the fact that a fluid flow having a parabolic velocity distribution due to a low Reynolds number can also be converted into a plug flow. By virtue of this advantage, the flow rate of a fluid having a low Reynolds number can be measured with high precision, and thus the measurable range of flow meters can be extended.

Figure 8:
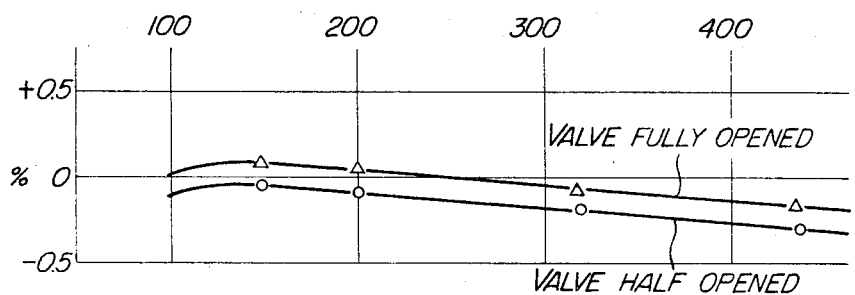
FIG. 8 is a graph showing instrumental errors observed with the flow rate measuring system shown in FIG. 7.

According to the API Standards, ISA Standards, etc., the Reynolds number was the sole factor for determining the measurability of the flow rate of fluids and these standards instructed that a flow straighter or a straight pipe portion of a certain length may be solely provided when a fluid subject to flow rate measurement has a Reynolds number higher than about $10^4$. However, experiments conducted by the inventors have proved that this prior art practice is erratic as will be apparent from the description given hereinbefore. The advantage of the present invention over prior art systems of this kind will be readily apparent from the graph shown in FIG. 8 when compared with the similar graph shown in FIG. 2.

Figure 11:
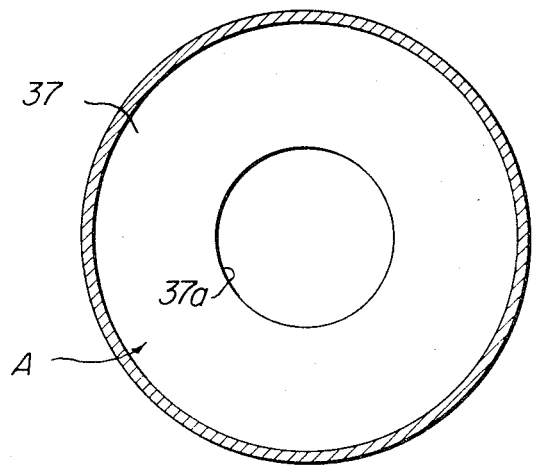

A practical structure of the flow conditioning apparatus of the present invention will be described in detail with reference to FIGS. 9 to 11.

The flow conditioning apparatus comprises an outer casing 31 having a fluid inlet port 32 and a fluid outlet port 33 of the same diameter $d$, and the vortex regulator C, flow straighter B and fluid flow velocity distribution uniformalizing means A are disposed in series between these ports 32 and 33 along the direction of fluid flow. Mounting flanges 32a and 32b are provided at the inlet and outlet ends respectively of the outer casing 31. The outer casing 31 is so shaped that the inner diameter thereof is increased stepwise from the fluid inlet port 32 toward the fluid outlet port 33 as seen in FIG. 9. More precisely, a tapered portion 34 extends from the inlet port 32 of diameter d until it has finally an inner diameter $d_1$ which is equal to the inner diameter of a second portion. A third portion connected to the second portion has an inner diameter D which is about two times as large as the inner diameter $d_1$ of the second portion. The rear end portion of the third portion is gradually tapered inwardly to terminate in the fluid outlet port 33.

The vortex regulator C comprises a perforate member 35 of network structure such as a screen or punched metal plate which is disposed perpendicularly with respect to the axis of the first portion 34 of the outer casing 31 so as to average the vortices of various sizes produced by a bent pipe or valve into uniform vortices of a size which is substantially equal to the mesh. The flow straighter B comprises, for example, a bundle of a plurality of tubes 36 of small diameter fixedly disposed in the second portion of the outer casing 31 as seen in FIG. 10.

The fluid flow velocity distribution uniformalizing means A has a structure similar to that described with reference to FIG. 3. More precisely, an annular lip 37 defining an orifice of diameter $D_2$ which is considerably smaller than the inner diameter D of the third portion of the outer casing 31 extends radially inwardly from the inner wall of the outer casing 31 as seen in FIG. 11 and is sharp-edged at its inner end edge 37a. The diameter $D_2$ of the orifice defined by the annular lip 37 is equal to or slightly larger than the diameter of the inlet of a fluid flow responsive means or flow meter, hence it is equal to or slightly larger than the diameter $d$ of the fluid outlet port 33 of the outer casing 31. The distance $l$ between the outlet of the flow straighter B in the preceding stage and the annular lip 37 is larger than the diameter $D_2$ of the orifice defined by the annular lip 37 for forming a deep pocket 38 so that a fluid flowing along the inner wall of the outer casing 31 is subject to turbulence and can be supplied to the flow meter in the form of a plug flow having a uniform velocity distribution. Another annular lip 39 tapering forwardly or toward the upstream side extends from the inner wall of the outer casing 31 at a position downstream of the annular lip 37 and adjacent to the fluid outlet port 33. The annular lip 39 defines an orifice of diameter $D_1$ and is sharpedged at its inner end edge 39a. The diameter $D_1$ of the orifice defined by the annular lip 39 is preferably equal to or slightly larger than the diameter $d$ of the fluid outlet port 33 as in the case of the diameter $D_2$ of the orifice defined by the annular lip 37. A small annular recess 40 is formed behind the annular lip 39.

The outer casing 31 of the flow conditioning apparatus including the means A, B and C is disposed in a conduit system in which various conduit elements such as a bent pipe and a valve are disposed on the upstream side as shown in FIG. 7, and a flow meter is connected to the fluid outlet port 33 of the outer casing 31. Thus, when a fluid flows in a direction as shown by the arrows in FIG. 9, the fluid is conditioned sequentially as explained with reference to FIGS. 7E to 7A so that the fluid can be supplied to the flow meter in the form of a complete conditioned flow or plug flow.

It will be understood from the above description that the present invention provides a flow conditioning apparatus of very simple construction which comprises a vortex regulator, a flow straighter and a flow converting means or fluid flow velocity distribution uniformalizing means disposed in the above order within a single casing having flanged ends and is interposed in a desired conduit system by connecting it to the conduit and a flow meter by means of the flanges.

The present invention having the construction described above eliminates an undesirable non-uniform flow that may be supplied to the flow meter during the measurement of the flow rate of a fluid thereby improving the precision of measurement of the flow rate. The flow conditioning apparatus according to the present invention can be manufactured at low costs due to the fact that the vortex regulator, the flow straighter and the velocity distribution uniformalizing means are assembled as a unit, and it is apparent that such apparatus is quite effective for conditioning the flow of various kinds of fluids and uniformalizing the velocity distribution of such fluids.

What is claimed is:

1. A flow conditioning apparatus for incorporation in a fluid conduit system including a fluid flow responsive means therein, said apparatus comprising means adapted to be disposed upstream of said fluid flow responsive means for uniformalizing the velocity distribution of the flow of fluid in a plane perpendicular to the axis of the conduit thereby to supply a uniformalized flow of fluid to said fluid flow responsive means, said fluid flow velocity distribution uniformalizing means including a generally cylindrical body having an inlet end, an outlet end, and an intervening inner diameter larger than the diameter of the inlet of said fluid flow responsive means, a first sharp-edged annular lip extending radially inwardly from the inner wall of said cylindrical body in coaxial relation with said body and defining a first orifice whose diameter is no smaller than the diameter of the inlet of said fluid flow responsive means, said first orifice being spaced downstream from the inlet end of said cylindrical body to form a pocket between said inlet end and said first orifice, and a second annular lip positioned downstream of said first lip and sloping toward said first annular lip, said second lip extending inwardly from the inner wall of said body adjacent to the outlet end of said body to define a second orifice downstream of the first orifice and upstream of the inlet of said fluid flow responsive means.

2. A flow conditioning apparatus as claimed in claim 1, in which a flow straighter is provided upstream of said fluid flow velocity distribution uniformalizing means and is connected with said means.

3. A flow conditioning apparatus as claimed in claim 1, in which a vortex regulator including a perforate member of network structure is disposed upstream of said fluid flow velocity distribution uniformalizing means and is connected with said means.

4. A flow conditioning apparatus as claimed in claim 1, in which a cylindrical extension extends integrally from said cylindrical body of said fluid flow integrally from said cylindrical body of said fluid flow velocity distribution uniformalizing means in an upstream direction and in coaxial relation with said body, and a vortex regulator including a perforate member of network structure and a flow straighter disposed within said extension on the upstream side of said fluid flow velocity distribution uniformalizing means.

5. A flow conditioning apparatus as claimed in claim 1, in which said second annular lip is shaped to define an annular recess adjacent the outlet end of said body.

6. A flow conditioning apparatus as claimed in claim 4, in which said perforate member of network structure is spaced a predetermined distance from the inlet port of said extension, the portion of said extension from said inlet port to said perforate member being tapered so as to be gradually enlarged in diameter in the downstream direction, the portion of said extension containing said flow straighter therein having a cylindrical shape of constant diameter connected to the inlet end of said body, said cylindrical body having an inner diameter larger than the diameter of said flow straighter, and said first annular lip being spaced from the inlet end of said body by a distance greater than the diameter of said first orifice to define a deep pocket therebetween.

7. The apparatus of claim 1 wherein said second annular lip is sharp-edged.

8. The apparatus of claim 1 wherein the diameter of said second orifice is no smaller than the diameter of the inlet of said fluid flow responsive means.

* * * * *